(12) United States Patent
Cheek

(10) Patent No.: US 7,467,475 B1
(45) Date of Patent: Dec. 23, 2008

(54) LEVELING DEVICE

(76) Inventor: Attila G. Cheek, 7770 Crestwood La., Northfield, OH (US) 44067

( * ) Notice: Subject to any disclaimer, the term of this patent is extended or adjusted under 35 U.S.C. 154(b) by 0 days.

(21) Appl. No.: 11/827,192

(22) Filed: Jul. 11, 2007

(51) Int. Cl.
*G01C 9/24* (2006.01)

(52) U.S. Cl. .............................. 33/379; 33/384; 33/202; 33/1 R; 33/DIG. 1

(58) Field of Classification Search ................ 33/379, 33/370, 371, 374–376, 381, 384–389, 534, 33/202, 628, 630, 633, 634, 640, 282, 283, 33/285, 1 N, 1 R, DIG. 1; 83/477.2
See application file for complete search history.

(56) References Cited

U.S. PATENT DOCUMENTS

| | | | | |
|---|---|---|---|---|
| 2,074,108 A | * | 3/1937 | Graham | 33/337 |
| 2,079,070 A | * | 5/1937 | Johnston | 33/337 |
| 2,348,095 A | * | 5/1944 | Roby | 33/372 |
| 2,677,184 A | * | 5/1954 | Lindenbein | 33/466 |
| 3,009,250 A | * | 11/1961 | Schock | 33/388 |
| 4,443,950 A | | 4/1984 | Cockeram | |
| 4,635,376 A | * | 1/1987 | Fry | 33/384 |
| 4,779,354 A | | 10/1988 | Hill | |
| 5,063,679 A | * | 11/1991 | Schwandt | 33/347 |
| 5,116,249 A | | 5/1992 | Shiotani et al. | |
| 5,121,553 A | | 6/1992 | Boerder | |
| 5,187,877 A | | 2/1993 | Jory | |
| 5,216,964 A | | 6/1993 | Sato | |
| 5,546,670 A | * | 8/1996 | Chiang | 33/640 |
| 5,743,161 A | | 4/1998 | Boudreau | |
| 6,263,584 B1 | | 7/2001 | Owens | |
| 7,165,338 B2 | | 1/2007 | Clifton | |
| 2004/0040169 A1 | | 3/2004 | Davis | |

* cited by examiner

*Primary Examiner*—G. Bradley Bennett
*Assistant Examiner*—Amy Cohen Johnson
(74) *Attorney, Agent, or Firm*—Forrest Collins, Esq.; Forrest L. Collins Law Offices, LLC

(57) ABSTRACT

A leveling device permitting adjustment to level of a table saw planar surface by a first bubble level and thereafter adjustment of the leveling device to a desired cutting angle, followed by setting the table saw blade to the point where a second perpendicular bubble level.

7 Claims, 5 Drawing Sheets

LEVELING DEVICE

BACKGROUND OF THE INVENTION

1. Field of the Invention

The purpose of this invention is to permit exact cuts by a table saw.

2. Description of the Art Practices

Boerder in U.S. Pat. No. 5,121,553 issued Jun. 16, 1992 posits a table saw gauge includes a body positionable on the table top of a table saw and having a first scale for determining the saw blade height, a second scale for determining the saw blade angle, and a third scale for determining the distance from the saw blade to an adjacent fence. A blade is pivotally supported on the body and includes a first armature for engaging the uppermost tooth of the saw blade to determine saw blade height and second armature engageable with the side of the saw blade to determine saw blade angle. Pointers mounted on the body will aid cooperation with the first and second scales mounted on the body to indicate the height of the saw blade and the angle of the saw blade, respectively.

U.S. Pat. No. 6,263,584 issued on Jul. 24, 2001 to Owens sets forth an apparatus and method for configuring the angular alignment of a device or apparatus, such as a table saw blade. Specifically, the present invention includes a housing unit containing a light source for generating an optic marker, preferably a planar beam, a mechanism by which the housing unit is attached to the apparatus to be aligned, and a scaled protractor for calculating the angular relationship in degrees.

U.S. Pat. No. 7,165,338 issued on Jan. 23, 2007 to Clifton describes an apparatus and method for measuring an item to be cut on a saw. The apparatus includes a backstop attached to a support surface, a first measuring means attached to the backstop for providing a lateral measure-ment of distance from a cutting means, a second measuring means for providing a measurement beyond a length of the backstop, and a third measuring means attached to the backstop for providing a measurement for vertical adjustment of the second measuring means. In one embodiment, the first and second measuring means are linear measurement scales, such as rulers, and the third measuring means, in yet another embodiment, is a coilable tape measure.

U.S. Pat. No. 5,216,964 issued to Sato on Jun. 8, 1993 describes a circular saw having a table on which a workpiece is laid in which a saw blade whose bevel angle can be adjusted is mounted on an operating arm which may be held in a raised position and a lowered position relative to the table. The circular saw includes a fixed support member fixed to the table, the fixed support member having a pair of recesses each of which has a slanted reception surface relative to a slide surface of the fixed support member; a movable support member mounted rotatably on the fixed support member for supporting the operating arm, the movable support member having a an arcuate guide hole, the movable support member having a pair of mount screw holes perpendicular to the reception surfaces; a stationary shaft which passes through the arcuate guide hole formed in the movable support member and which engages with the fixed support member; and a pair of adjusting screws which penetrate the mount screw holes and which are alternatively held in abutment with the reception surfaces.

U.S. Pat. No. 5,187,877 issued to Jory on Feb. 23, 1993 describes an adjustable angle instrument configured from a pair of similar metal sector parts, each having a sector shape with a wide double flange along a straight edge. The two sector parts are accurately pivoted together in an apex region. Each flange is made to have accurate surfaces on its outer surfaces on which the instrument may be stood in a vertical position or laid horizontally on a flat surface such as a saw table. The flanges may be set to any angle between 45 and 90 degrees as indicated by a calibratable hairline cursor, and the angle may be captured by locking the two sector parts together by tightening a knurled brass knob. One of the sector parts is also provided with an edge which is accurately machined at 90 degrees relative to the flange and thus may be set to any angle between 0 to 45 degrees relative to the other flange, providing the instrument with a total range of 0 to 90 degrees. The scale, made as separate part and attached to one of the sector parts, extends along an arc of about seven inches at a nine inch radius and is machine marked to provide 0-45 and 45-90 degree ranges with accuracy better than .+-.0.05 degrees. The instrument may be used to set up various types of power saws and other machinery, to act as a workpiece guide and to mark angles on workpieces. It is also useful as a drafting aid and as a highly accurate instrument for general measurement of angles. Each of the instruments' two flanges is provided with four mounting holes which may be utilized for adding extensions in either width or length.

U.S. Pat. No. 5,116,249 May 26, 1992 Shiotani, et al. A table saw has a circular saw table, a miter table and a supplementary table to form a working table, on the front and rear sides of which two guide rails are disposed slidably with respect to the working table. The miter table has a miter fence thereon whose pivot points are provided at two separate positions.

U.S. Pat. No. 4,779,354 issued to Hill Oct. 25, 1988 sets forth an improved adjustable protractor including a flat base member in pivoted connection with a pivoting member. The base member is calibrated with degrees indicia. The pivoting member includes an indicia indicator to detect designated degree indicia. A clamp is provided to clamp members together at a selected position.

U.S. Pat. No. 4,443,950 Cockeram Apr. 24, 1984 The invention relates to rotating saw blade adjustment devices in general, and more specifically to a very simple apparatus, comprising two metal brackets, which when used in conjunction with an adjustable triangle and/or framing square, can provide precision adjustments for either a radial arm saw or a table saw.

U.S. Pat. No. 5,743,161 issued to Boudreau on Apr. 28, 1998 sets out an angularly adjustable table saw jig which comprises a base plate having an upper flat surface for supporting a work piece to be cut, a means for slidably attaching the jig to a table cutting tool, an upwardly extending work advancing abutment rotatably connected to the base plate at an axis of rotation for advancing work into cutting engagement with a table cutting blade, and a slot extending generally parallel to a cutting path of the cutting blade for providing clearance for the cutting blade as the jig is advanced into cutting engagement therewith. The jig also includes an elongated guide rail, which is rotatably connected to the base plate, and whose axis of rotation lies in the same plane of the cutting blade. The jig may include further a shield for preventing undesirable access to a spinning saw blade and for preventing injury from flying debris, a work piece restraining means for preventing movement of work pieces and resultant inaccurate cutting and injury, and a safety cutoff means for preventing power from flowing to the table cutting tool when the operator's hands are not located properly.

Davis United States Patent Application 20040040169 published Mar. 4, 2004 describes an alignment device (10) for use in aligning a power tool blade or bit or a metal frame, includes: a) a generally rectangular-shaped body (26), the body (26) having thereon two opposite, substantially parallel and planar side surfaces (20, 22), substantially parallel and planar opposite top and bottom surfaces (14, 16), the top and bottom surfaces (14, 16) being positioned at substantially right angles to the side surfaces (20, 22), substantially planar rear and front surfaces (18, 12), the top and bottom surfaces (14, 16) and side surfaces (20, 22) being positioned at substantially right angles to four edges, respectively, of the rear surface (18), the front surface (12) being angled; b) at least two contact posts (36, 38) on the front or rear surface; c) a power source (50) within the device, the contact posts (36, 38) being connected to the power source; and d) a light source (46, 48) or sound source (49) connected with the power source (50); wherein the light source lights up or the sound source sounds when the contact posts (36, 38) contact a metal surface. Note the numerical references are to the drawings in United States Patent Application 20040040169.

To the extent that the foregoing references are relevant to the present invention, they are herein specifically incorporated by reference. Certain portions of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

SUMMARY OF THE INVENTION

The present invention describes a leveling device having a leveling device base;

said leveling device base having located on one side thereof at least one leveling device base magnet;

extending from said leveling device base is a leveling device bubble retention mechanism;

a leveling device protractor window is located within the leveling device bubble retention mechanism;

a leveling device sight line is positioned to bisect the leveling device protractor window;

extending from said leveling device base is a leveling device vertical riser;

said leveling device vertical riser having a leveling device vertical riser channel;

said leveling device vertical riser channel adapted to receive a first leveling device threaded screw mechanism;

said leveling device vertical riser channel adapted to receive a second leveling device threaded screw mechanism;

said first leveling device threaded screw mechanism retaining a leveling device cylindrical workpiece and a leveling device protractor obverse side;

said second leveling device threaded screw mechanism retaining a leveling device protractor reverse side;

said leveling device bubble retention mechanism having a leveling device horizontal bubble level and a leveling device vertical bubble level;

said leveling device horizontal bubble level and said leveling device vertical bubble level being oriented in a perpendicular relationship to one another; and, said leveling device protractor obverse side having thereon a leveling device protractor scale.

The present invention describes also describes a method of exacting the cut of an article to a desired angle including the steps of:

obtaining a table saw comprising a table saw planar surface and a table saw blade;

obtaining a leveling device having a leveling device base;

said leveling device base having located on one side thereof at least one leveling device base magnet;

extending from said leveling device base is a leveling device bubble retention mechanism;

a leveling device protractor window is located within the leveling device bubble retention mechanism;

a leveling device sight line is positioned to bisect the leveling device protractor window;

extending from said leveling device base is a leveling device vertical riser;

said leveling device vertical riser having a leveling device vertical riser channel;

said leveling device vertical riser channel adapted to receive a first leveling device threaded screw mechanism;

said leveling device vertical riser channel adapted to receive a second leveling device threaded screw mechanism;

said first leveling device threaded screw mechanism retaining a leveling device cylindrical workpiece and a leveling device protractor obverse side;

said second leveling device threaded screw mechanism retaining a leveling device protractor reverse side;

said leveling device bubble retention mechanism having a leveling device horizontal bubble level and a leveling device vertical bubble level;

said leveling device horizontal bubble level and said leveling device vertical bubble level being oriented in a perpendicular relationship to one another;

said leveling device protractor obverse side having thereon a leveling device protractor scale;

placing said leveling device on said table saw planar surface such that the at least one leveling device base magnet retains said leveling device base thereon;

adjusting said leveling device horizontal bubble level to a desired reading with said leveling device locking screw nut;

setting the desired angle that the article is to be cut on said leveling device protractor scale with said second leveling device locking screw nut;

placing said leveling device base on said table saw blade; and, adjusting said table saw blade to such that said leveling device vertical bubble level is at a desired reading.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

With more particular reference to the drawings the following is set forth.

DETAILED DESCRIPTION OF THE INVENTION

The present invention deals with obtaining articles that are cut to precise measurements. In particular, the invention deals with woodworking, however, it also has applicability to metalworking as well. The invention is uniquely adapted to the amateur woodworker or metalworker as well as to professionals.

In particular, it is difficult to make precise angled cuts utilizing even the most sophisticated saw blades. For example, a typical table saw has a planar surface on which a workpiece such as wood is placed. The saw blade in a typical table saw is circular and extends through the planar surface of the table saw.

The first difficulty in dealing with a table saw is that the legs or base of the table saw touching the floor of the structure in which the table saw is placed may not be perfectly level. The second difficulty in dealing with the table saw is that even if the legs terminate in a single plane is that the floor of the structure in which table saw is placed may not be perfectly level. Thirdly, even though the table saw will typically have a crank control to permit adjustment of the saw in relation to the planar surface of the table saw the original adjustment of the crank control relative to the planar surface of the table saw and/or the blade may result in an out of specification problem. Out of specification problem means that, for instance, when the saw blade is desired to be at 90 degrees to the planner surface of the table saw that some other condition causes of the saw blade to be in a different orientation. The out of specification condition may result from poor manufacturing techniques, damage during shipping, or through wear the table saw.

The present invention provides and effective method of correcting out of specification conditions. Thus, planar surface of a table saw and the table saw blade may be correctly oriented to provide a correct orientation throughout the entire range that the table saw is intended to cut.

Figure 1:
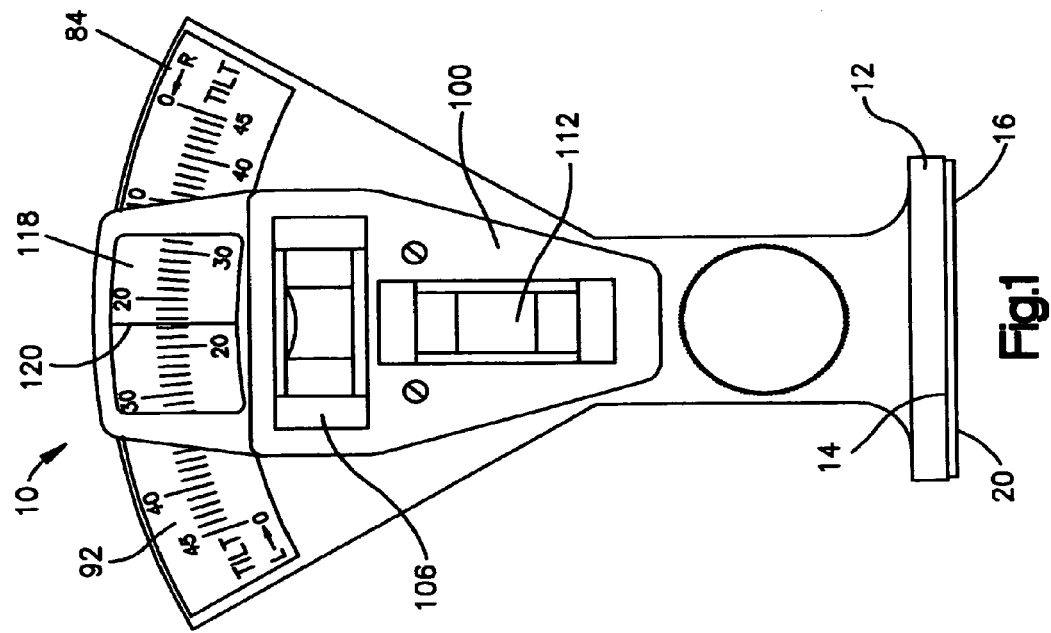
FIG. 1 is a frontal view of the leveling device 10.
Figure 4:
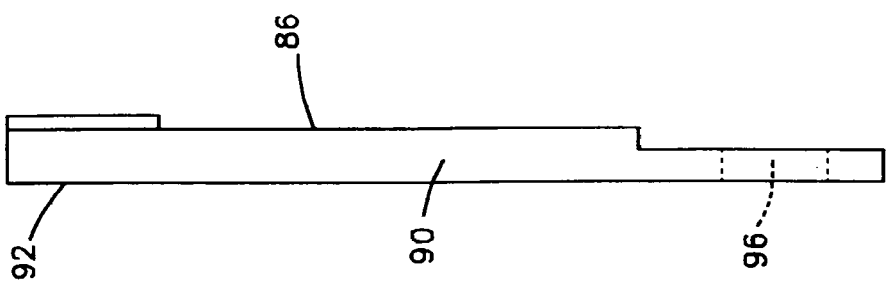
FIG. 4 is a right side view of the leveling device 10 according to FIG. 3.
Figure 3:
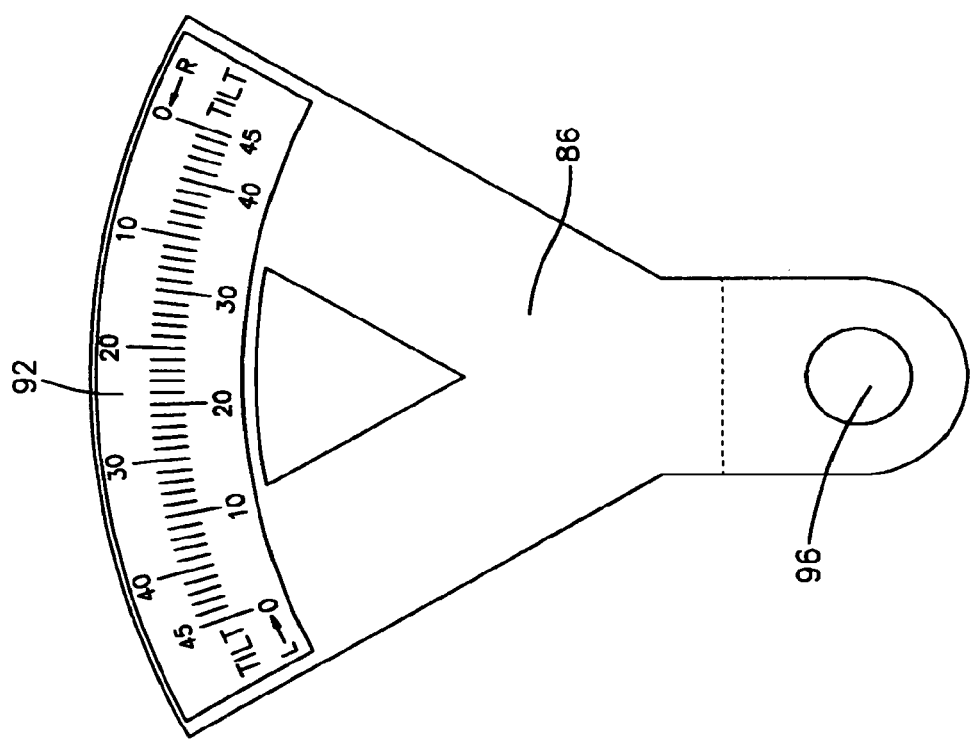
FIG. 3 is a partial frontal view of the leveling device 10 according to FIG. 1.

As best seen in FIG. 1 is a leveling device 10. The leveling device 10 is comprised in part of a leveling device base 12. The leveling device base 12 has a leveling device base upper surface 14. Opposite the leveling device base upper surface 14 is a leveling device base lower surface 16.

Figure 6:
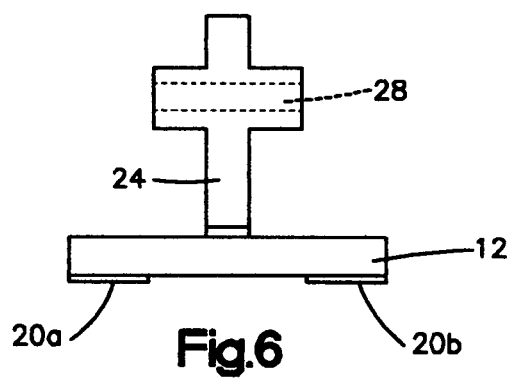
FIG. 6 is a partial frontal view according to FIG. 5.

A leveling device base magnet 20 is located on the leveling device base lower surface 16. The leveling device base magnet 20 may cover substantially the entire surface of the leveling device base lower surface 16. Alternatively, the leveling device base magnet 20 may be segmented into one or more parts. In one embodiment, the leveling device base magnet 20 has a spaced apart region between two separate magnets 20A and 20B as shown in FIG. 6.

A leveling device vertical riser 24 rises perpendicularly from the leveling device base upper surface 14. The leveling device vertical riser 24 may be an integral part of the leveling device base upper surface 14. The leveling device vertical riser 24 may also be a separate piece affixed to the leveling device base upper surface 14. The leveling device vertical riser 24 may be affixed to the leveling device base upper surface 14 by welding, adhesives, screws or the like. Conveniently, the leveling device vertical riser 24 as a general shape of a mantle clock when viewed from the front.

A leveling device vertical riser channel 28 is located through the leveling device vertical riser 24. The leveling device vertical riser channel 28 is generally perpendicular to the lengthwise direction of the leveling device vertical riser 24. That is, the leveling device vertical riser channel 28 will also be generally perpendicular to the leveling device base upper surface 14. The leveling device vertical riser channel 28 is threaded.

Figure 5:
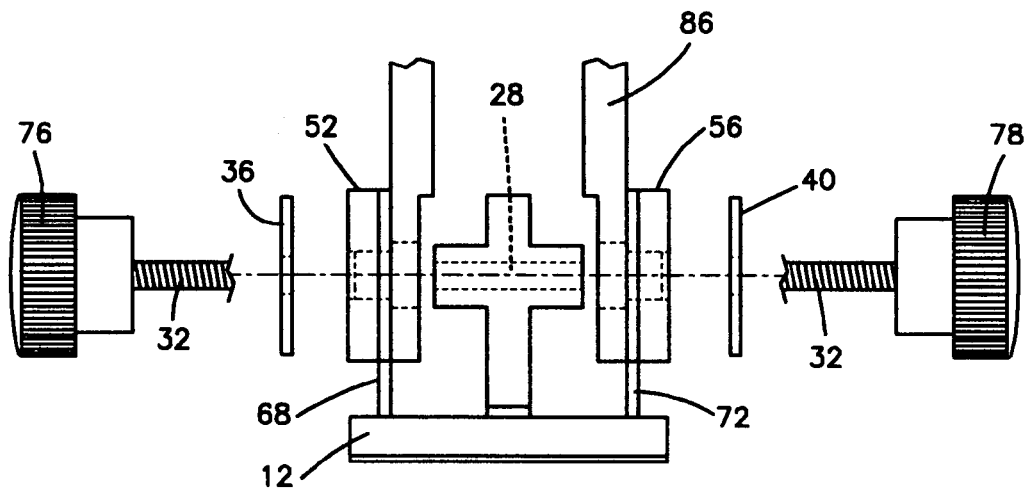
FIG. 5 is a partial side view of the leveling device 10.

A leveling device threaded screw mechanism 32 is devised of a sufficient length and the diameter to extend through and beyond the leveling device vertical riser channel 28. The purpose of the leveling device threaded screw mechanism 32 is more particularly shown according to FIG. 5.

A leveling device first floating washer 36 is associated with the leveling device threaded screw mechanism 32 when the leveling device 10 is assembled. Typically, the leveling device first floating washer 36 is cylindrical. A leveling device first floating washer opening 44 extends through the circumferential center of the leveling device first floating washer 36. The leveling device first floating washer 36 has a typical thickness of about 10 percent of the diameter of the leveling device first floating washer 36.

A leveling device second floating washer 40 is also associated with the leveling device threaded screw mechanism 32 when the leveling device 10 is assembled. Typically, the leveling device second floating washer 40 is cylindrical. A leveling device second floating washer opening 48 extends through the circumferential center of the leveling device second floating washer 40. The leveling device second floating washer 40 has a typical thickness of about 10 percent of the diameter of the leveling device second floating washer 40.

Figure 5A:
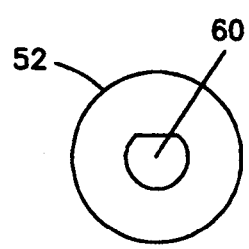
FIG. 5A is a partial right side view according to FIG. 5.
Figure 5B:
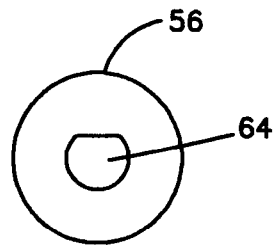
FIG. 5B is a partial left side view according to FIG. 5.

A leveling device cylindrical workpiece 52 is employed with the leveling device first floating washer 36 as best seen in FIG. 5A. leveling device cylindrical workpiece 52 has a first opening 60. A leveling device cylindrical workpiece 56 is best seen in FIG. 5B. The leveling device cylindrical workpiece 56 has an opening 64.

Figures 7, 8:
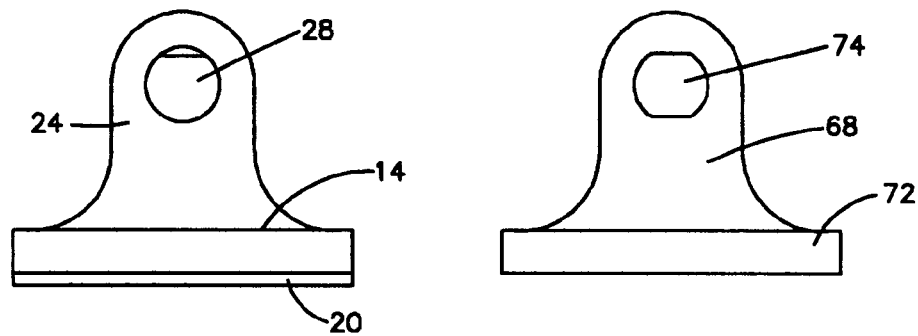
FIG. 7 is a partial right side frontal view according to FIG. 1.
FIG. 8 is a partial left side frontal view according to FIG. 1.

As best seen in FIG. 7 is a leveling device vertical riser 24. The leveling device vertical riser 24 has a generally mantle clock shaped. The leveling device vertical riser 24 has leveling device vertical riser channel 28 toward the upper region of the leveling device vertical riser 24.

As shown in FIG. 8 is a leveling device lock washer 68. The leveling device lock washer 68 is generally mantle clock shaped. The leveling device lock washer 68 has a leveling device lock washer 72. The leveling device lock washer 72 has a flat base. A leveling device vertical riser channel 74 extends through the leveling device lock washer 68. As noted, the leveling device lock washer 68 and leveling device vertical riser 24 are similarly shaped and in assembly substantially overlap one another. The leveling device lock washer 68 is intended as a lock washer to reduce torque when the leveling device 10 is assembled and in use.

Figure 2:
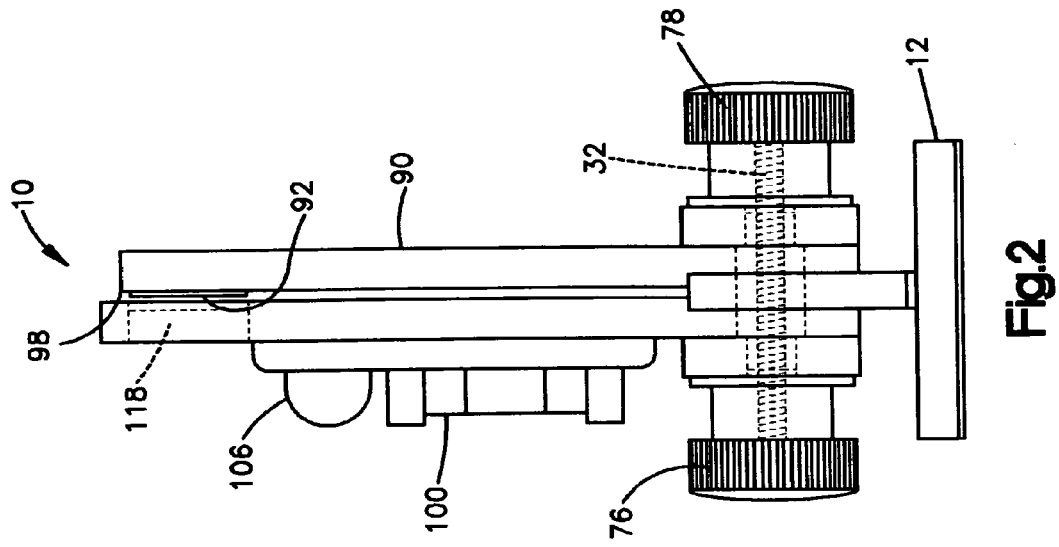
FIG. 2 is a right side view of the leveling device 10 according to FIG. 1.

Turning to FIG. 2, a leveling device locking screw nut 76 is shown. The leveling device locking screw nut 76 is of conventional design and is threaded on the interior to receive the leveling device threaded screw mechanism 32. Also has seen in FIG. 2 is a leveling device locking screw nut 80. The leveling device locking screw nut 80 is comparable to size and function to the leveling device locking screw nut 76. The leveling device locking screw nut 80 receives the opposite end of the leveling device threaded screw mechanism 32.

As best seen in FIG. 1 is the leveling device 84 protractor of the leveling device 10. When assembled, the leveling device 84 protractor is held in place by action of the leveling device locking screw nut 76 on the leveling device first floating washer 36.

The leveling device 84 protractor has a leveling device protractor obverse side 86. A leveling device protractor scale 92 is displayed on the leveling device protractor obverse side 86.

A leveling device protractor reverse side 90 is opposite the leveling device protractor obverse side 86. A leveling device protractor window 118 is located within the leveling device 84 protractor. When in use the leveling device protractor window 118 permits viewing of the leveling device protractor scale 92. A leveling device sight line 120 is positioned to bisect the leveling device protractor window 118. The leveling device sight line 120 if extended also bisects the leveling device horizontal bubble level 106 and the leveling device vertical bubble level 112.

A leveling device bubble retention mechanism 100 extends from the leveling device base 12. The leveling device bubble retention mechanism 100 provides a leveling device horizontal bubble level 106 and a leveling device vertical bubble level 112. The leveling device horizontal bubble level 106 is located perpendicularly to the leveling device vertical bubble level 112. The leveling device horizontal bubble level 106 is a conventional item giving a horizontal measurement when the leveling device 10 is placed on a planner surface. The leveling device vertical bubble level 112 provides a leveling measurement when placed on a vertical planner surface.

A leveling device protractor window 118 is located within the leveling device bubble retention mechanism 100. The leveling device protractor window 118 permits viewing and reading of the leveling device protractor scale 92.

The leveling device 10 is assembled by attaching to the leveling device base 12 to the leveling device vertical riser 24. As previously noted, the leveling device vertical riser 24 may be affixed to the leveling device base 12 by screws, bolts adhesives, or welding. The leveling device base magnet 20 is affixed to the leveling device base lower surface 16 on the leveling device base 12. The leveling device locking screw nut 76 is that attached to the leveling device threaded screw mechanism 32. At a later point the leveling device 10 is finally assembled the leveling device locking screw nut 80 is attached to the opposite end of the leveling device threaded screw mechanism 32. The leveling device threaded screw mechanism 32 is inserted through the leveling device first floating washer 36 to the leveling device cylindrical workpiece 52 through the leveling device cylindrical workpiece first opening 60. The leveling device threaded screw mechanism 32 is inserted through the leveling device protractor passage 96 and through the leveling device protractor reverse side 90.

The leveling device threaded screw mechanism 32 is then passed through the leveling device vertical riser channel 28 in the leveling device vertical riser 24 through the leveling device protractor obverse side 86 and the leveling device cylindrical workpiece 56. The leveling device threaded screw mechanism 32 continues through the leveling device second floating washer 40 and leveling device threaded screw mechanism 32 is then affixed to the 78. The length of the leveling device threaded screw mechanism 32 is such that when the respective leveling device first floating washer 36 or leveling device second floating washer 40 are tightened the threading within the leveling device vertical riser channel 28 permits a secure holding of the leveling device protractor obverse side 86 or the leveling device bubble retention mechanism 100 in place.

Figure 9:
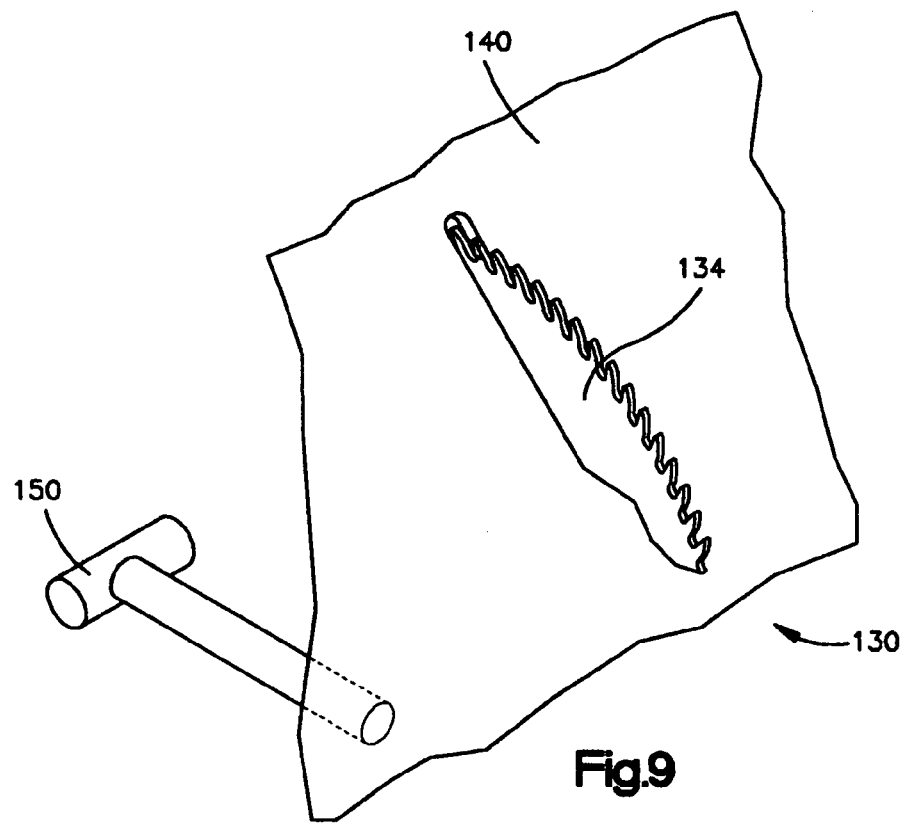
FIG. 9 is a partial view of a table top saw.
Figure 10:
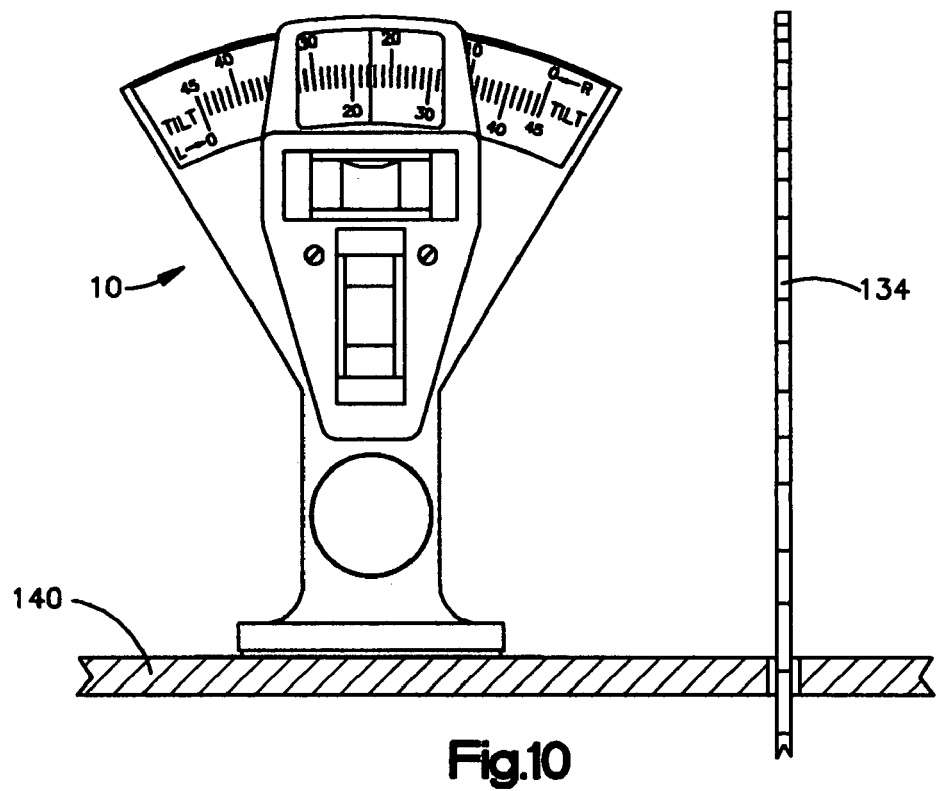
FIG. 10 is a frontal view of the leveling device 10 in position on the table surface of a table top saw; and, FIG. 11 is a frontal view of the leveling device 10 in position on a table top saw blade.

In the assembled leveling device 10 is then ready for use. As best seen in FIG. 9 is a partial view of a table saw 130. The table saw 130 has an adjustable table saw blade 134. The table saw 130 has a table saw planar surface 140. The table saw blade 134 passes through an opening in the table saw planar surface 140. The cutting angle of the table saw blade 134 is adjusted with a table saw leveling mechanism 150. The table saw leveling mechanism 150 permits the table saw blade 134 to be adjusted between 45 degrees and plus 45 degrees.

Typically, a table saw 130 will be able to cut anywhere from positive 45 degrees to negative 45 degrees from the planar surface of the table saw. That is, when an angle greater than 45 degrees is desired to cut to the workpiece is made utilizing the opposite side of table saw blade. Thus, when a cut of 60 degrees is desired to a workpiece on the positive side of the planner surface of the table saw then the cut is made at the negative 30 degrees setting for the orientation of the table saw blade.

As previously noted, in a perfect world, the table saw planar surface 140 of the table saw blade 134 would lie in a plane such that the table saw blade 134 when set to 0 degrees is perpendicular to the plane of the table saw planar surface 140. However, in reality the table saw blade 134 may not be perpendicularly aligned when the table saw leveling mechanism 150 has a 0 degrees setting due to the legs of the table not providing a flat surface. Moreover, adjustments to the table saw leveling mechanism 150 may indicate that the 0 degree reading on the table saw blade 134 is otherwise not accurate. Further, in many conventional table saws 130 the table saw leveling mechanism 150 is significantly below the level of the table saw planar surface 140 thereby making adjustments by the table saw leveling mechanism 150 difficult.

Figure 11:
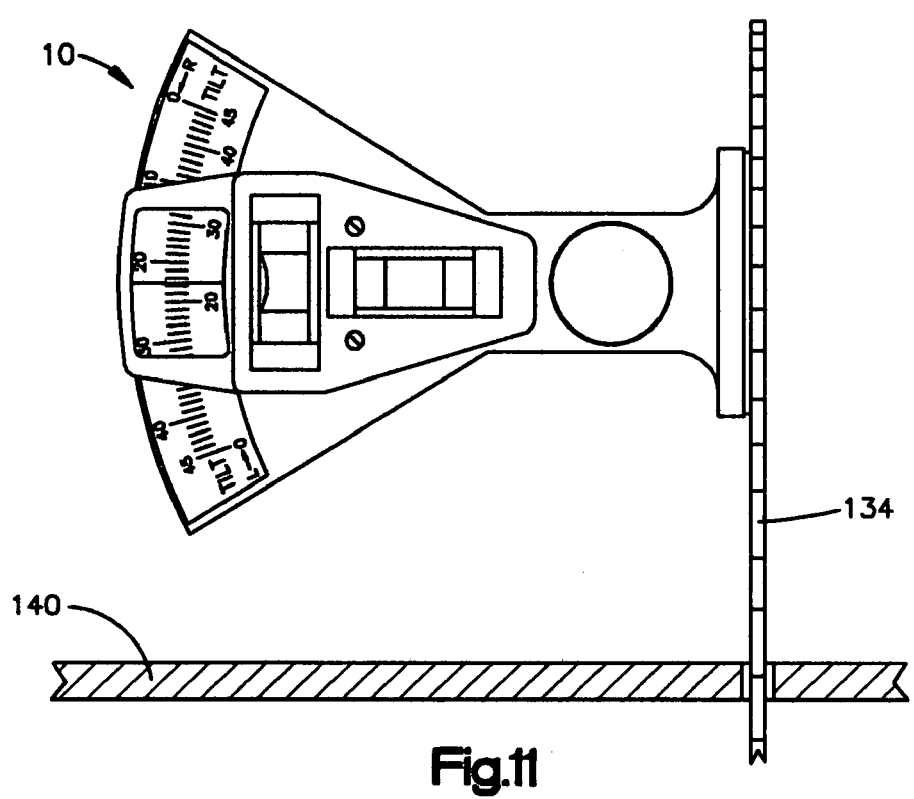

As best seen in FIG. 11, the leveling device 10 is placed on the table saw planar surface 140. A reading and adjustment of the leveling device horizontal bubble level 106 through the leveling device protractor window 118 will permit adjustment by the table saw leveling mechanism 150 to a desired setting (in this case 0 degrees). The leveling device 10 maybe then placed on the table saw blade 134. The leveling device 10 is retained on the table saw blade 134 by the leveling device base magnet 20. The table saw blade 134 may be permitted to move slightly as of the leveling device vertical bubble level 112 operates on the floating bubble principle. Thus, a reading of may be determined to see if the bubble is centered within the leveling device vertical bubble level 112. If the bubble is not centered within the leveling device vertical bubble level 112 then the table saw leveling mechanism 150 may be adjusted until of the leveling device vertical bubble level 112 is centered.

If adjustment is desired to be outside of the 0 degree setting then in the leveling device 10 is placed on the table saw planar surface 140 and adjusted to the desired reading such as a left tilt of 30 degrees. The leveling device locking screw nut 76 is done appropriately tightened to retain the leveling device bubble retention mechanism 100 in the correct orientation at a left tilt of 30 degrees. At this point of the leveling device 10 is affixed to the table saw blade 134 by the leveling device base magnet 20. A reading of the leveling device vertical bubble level 112 is then made. If the bubble is not centered on the leveling device vertical bubble level 112 then the table saw leveling mechanism 150 may be appropriately adjusted so that the leveling device protractor obverse side 86 then gives a level bubble reading of the leveling device vertical bubble level 112.

From the above description of the invention, those skilled in the art will perceive improvements, changes and modifications. Such improvements, changes and modifications within the skill of the art are intended to be covered by the appended claims.

What is claimed is:
1. A leveling device having a leveling device base;
said leveling device base having located on one side thereof at least one leveling device base magnet;

extending from said leveling device base is a leveling device bubble retention mechanism;

a leveling device protractor window is located within the leveling device bubble retention mechanism;

a leveling device sight line is positioned to bisect the leveling device protractor window;

extending from said leveling device base is a leveling device vertical riser;

said leveling device vertical riser having a leveling device vertical riser channel;

said leveling device vertical riser channel adapted to receive a first leveling device threaded screw mechanism;

said leveling device vertical riser channel adapted to receive a second leveling device threaded screw mechanism;

said first leveling device threaded screw mechanism retaining a leveling device cylindrical workpiece and a leveling device protractor obverse side;

said second leveling device threaded screw mechanism retaining a leveling device protractor reverse side;

said leveling device bubble retention mechanism having a leveling device horizontal bubble level and a leveling device vertical bubble level;

said leveling device horizontal bubble level and said leveling device vertical bubble level being oriented in a perpendicular relationship to one another; and, said leveling device protractor obverse side having thereon a leveling device protractor scale.

2. The leveling device according to claim 1, wherein a leveling device locking screw nut is connected to said first leveling device threaded screw mechanism.

3. The leveling device according to claim 2, wherein at least one leveling device lock washer is located between said leveling device locking screw nut and said leveling device protractor obverse side and/or said leveling device protractor reverse side.

4. The leveling device according to claim 3, wherein at least one leveling device lock washer is located between said leveling device locking screw nut and said leveling device protractor obverse side and a second leveling device lock washer is located between a second leveling device locking screw nut and said leveling device protractor reverse side.

5. A method of exacting the cut of an article to a desired angle including the steps of:
obtaining a table saw comprising a table saw planar surface and a table saw blade;
obtaining a leveling device having a leveling device base;
said leveling device base having located on one side thereof at least one leveling device base magnet;

extending from said leveling device base is a leveling device bubble retention mechanism;

a leveling device protractor window is located within the leveling device bubble retention mechanism;

a leveling device sight line is positioned to bisect the leveling device protractor window;

extending from said leveling device base is a leveling device vertical riser;

said leveling device vertical riser having a leveling device vertical riser channel;

said leveling device vertical riser channel adapted to receive a first leveling device threaded screw mechanism;

said leveling device vertical riser channel adapted to receive a second leveling device threaded screw mechanism;

said first leveling device threaded screw mechanism retaining a leveling device cylindrical workpiece and a leveling device protractor obverse side;

said second leveling device threaded screw mechanism retaining a leveling device protractor reverse side;

said leveling device bubble retention mechanism having a leveling device horizontal bubble level and a leveling device vertical bubble level;

said leveling device horizontal bubble level and said leveling device vertical bubble level being oriented in a perpendicular relationship to one another;

said leveling device protractor obverse side having thereon a leveling device protractor scale; and, placing said leveling device on said table saw planar surface such that the at least one leveling device base magnet retains said leveling device base thereon;

adjusting said leveling device horizontal bubble level to a desired reading with said leveling device locking screw nut;

setting the desired angle that the article is to be cut on said leveling device protractor scale with said second leveling device locking screw nut, placing said leveling device base on said table saw blade;

adjusting said table saw blade to such that said leveling device vertical bubble level is at a desired reading.

6. The method of claim 5, wherein the said leveling device horizontal bubble level is set to a level position while on said table saw planar surface.

7. The method of claim 6, wherein said leveling device vertical bubble level is thereafter set to a level position while located on said table saw blade.

\* \* \* \* \*